United States Patent
Wilhelmsson et al.

(10) Patent No.: US 10,342,041 B2
(45) Date of Patent: Jul. 2, 2019

(54) ACCESS TO A COMMUNICATIONS CHANNEL IN A WIRELESS COMMUNICATIONS NETWORK

(71) Applicant: Telefonaktiebolaget LM Ericsson (publ), Stockholm (SE)

(72) Inventors: Leif Wilhelmsson, Dalby (SE); Guido Roland Hiertz, Aachen (DE); Dzevdan Kapetanovic, Lund (SE); Christofer Lindheimer, Linkoping (SE); Filip Mestanov, Sollentuna (SE); Thomas Nilsson, Malmo (SE); Eric Nordstrom, Stockholm (SE); Hakan Persson, Solna (SE); Johan Soder, Stockholm (SE); Meng Wang, Sundbyberg (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 188 days.

(21) Appl. No.: 15/310,748

(22) PCT Filed: May 12, 2014

(86) PCT No.: PCT/EP2014/059615
§ 371 (c)(1),
(2) Date: Nov. 11, 2016

(87) PCT Pub. No.: WO2015/172805
PCT Pub. Date: Nov. 19, 2015

(65) Prior Publication Data
US 2017/0086224 A1 Mar. 23, 2017

(51) Int. Cl.
*H04W 74/04* (2009.01)
*H04W 72/12* (2009.01)
(Continued)

(52) U.S. Cl.
CPC ........... *H04W 74/04* (2013.01); *H04W 52/34* (2013.01); *H04W 72/121* (2013.01); *H04W 52/243* (2013.01); *H04W 84/12* (2013.01)

(58) Field of Classification Search
CPC ...... H04W 74/00; H04W 52/00; H04W 72/00
See application file for complete search history.

(56) References Cited

U.S. PATENT DOCUMENTS

2006/0062146 A1* 3/2006 Sebire ............... H04W 72/1284
370/230
2011/0081865 A1 4/2011 Xiao et al.
(Continued)

FOREIGN PATENT DOCUMENTS

CN 101043693 B 5/2011
JP 2008160182 A 7/2008
(Continued)

OTHER PUBLICATIONS

PCT International Search Report, dated Mar. 5, 2015, in connection with International Application No. PCT/EP2014/059615, all pages.
(Continued)

*Primary Examiner* — Andrew Lai
*Assistant Examiner* — Sumitra Ganguly
(74) *Attorney, Agent, or Firm* — Leffler Intellectual Property Law, PLLC (57) ABSTRACT

There is provided access to a communications channel in a wireless communications network. Stations (STAs) associated with an access point (AP) are grouped in at least two groups of STAs, each group being associated with a minimum transmission power level needed by the AP to communicate with the STAs in that group. A first time interval is allocated for a first group of STAs associated with highest minimum transmission power to access the communications channel concurrently with a third time interval being allocated by another AP for a third group of STAs associated with lowest minimum transmission power level needed by said another AP to communicate with the third group of STAs to access the communications channel. A second time interval, non-overlapping with the first time interval, is allocated for a second group of STAs associated with lowest minimum transmission power to access the communications channel concurrently with a fourth time interval being allocated by said another AP for a fourth group of STAs associated with highest minimum transmission power level needed by said another AP to communicate with the fourth group of STAs to access the communications channel.

18 Claims, 4 Drawing Sheets

(51) Int. Cl.
*H04W 52/34* (2009.01)
*H04W 84/12* (2009.01)
*H04W 52/24* (2009.01)

(56) References Cited

U.S. PATENT DOCUMENTS

| | | | |
|---|---|---|---|
| 2011/0205929 A1* | 8/2011 | Quek | H04W 16/30 370/252 |
| 2012/0163349 A1* | 6/2012 | Fontaine | H04W 72/1263 370/336 |
| 2013/0143616 A1* | 6/2013 | Han | H04W 52/18 455/522 |

FOREIGN PATENT DOCUMENTS

| | | |
|---|---|---|
| JP | 2013106079 A | 5/2013 |
| WO | 2006043588 A1 | 4/2006 |

OTHER PUBLICATIONS

PCT Written Opinion, dated Mar. 5, 2015, in connection with International Application No. PCT/EP2014/059615, all pages.

O. Oteri et al., Advanced Power Control Techniques for Interference Mitigation in Dense 802.11 Networks, 2013 16th International Symposium on Wireless Personal Multimedia Communications, Jun. 24, 2013, pp. 1-7.

Li Zheng et al., Overlapping Impacts and Resources Coordination for High-density Wireless Communication, Computing and Communication Technologies, 2009, RIVF '09, International Conference, IEEE, Piscataway, NJ, USA, Jul. 13, 2009, pp. 1-7.

IEEE P802.11ah / D1.2, Draft Standard for Information technology—Telecommunications and information exchange between systems Local and metropolitan area networks—Specific requirements, Part 11: Wireless LAM Medium Access Control (MAC) and Physical Layer (PHY) Specifications, Feb. 2014, pp. 1-442.

Japanese Office Action, dated Apr. 9, 2018, in connection with Japanese Application No. 2016-567248, 5 pages.

English language translation of Japanese Office Action, dated Apr. 9, 2018, in connection with Japanese Application No. 2016-567248, 5 pages.

* cited by examiner

ACCESS TO A COMMUNICATIONS CHANNEL IN A WIRELESS COMMUNICATIONS NETWORK

TECHNICAL FIELD

Embodiments presented herein relate to a wireless communications network, and particularly to a method, an access point, a computer program, and a computer program product for allocating access to a communications channel in the wireless communications network.

BACKGROUND

In communications networks, there may be a challenge to obtain good performance and capacity for a given communications protocol, its parameters and the physical environment in which the communications network is deployed.

For example, there is an increased usage of Wireless Local Area Networks (WLANs) based on the IEEE 802.11 family of standards. The IEEE 802.11 family of standards relates to communications standards for wireless local area networks. The maximum physical (PHY) layer bit rates of 802.11 have evolved from 2 Mb/s in IEEE 802.11-1997 to several Gb/s available with the current most amendment as represented by IEEE 802.11ac. Currently, IEEE 802.11n is a commonly used WLAN standard with support for multiple-input multiple-output (MIMO) compliant communications technologies, having a 40 MHz bandwidth and a maximum throughput in excess of 100 Mb/s.

A typical WLAN deployment comprises a number of network nodes, referred to as access points (APs), and a number of wireless end-user transceiver terminals, referred to as stations (STAs), associated with one of these APs. An access point and the associated STAs are referred to as a basic service set (BSS). Within a BSS, channel access is typically performed in a distributed manner using a distributed coordinated function (DCF) or a variety thereof, such as Enhanced Distributed Channel Access (EDCA). One main feature of DCF and its descendants is that it is based on carrier sense multiple access with collision avoidance (CSMA/CA), meaning that a STA senses the channel and only if the channel is sensed to be idle is the STA allowed to transmit. DCF and CSMA/CA is as such well known by the person skilled in the art.

It is possible that two or more APs may generate interference to each other in a geographical area. When the number of APs per area unit is relatively small, it is often possible to allocate different channels (frequencies) to APs that are within mutual range. In this way the APs will not interfere with each other. However, when the deployments become denser, the same channel may have to be reused such that APs and STAs using the same channel may interfere with each other. This kind of interference is commonly known as co-channel interference. Issues such as co-channel interference may also be expected to increase when wider channel are used since this implies that a smaller number of non-overlapping channels is available.

Situations with APs and associated STAs that interfere as described above is commonly referred to as overlapping BSS (OBSS). Co-channel interference is an issue also in cellular systems such as Long-Term Evolution (LTE) based communications networks developed by the 3rd Generation Partnership Project (3GPP), but because of the CSMA/CA mechanism its effect may be considerably worse for WLANs since WLANs need to cater for unlicensed/uncoordinated deployments.

The OBSS may effectively lead to that many of the BSS will not carry any traffic because the channel is sensed being busy due to traffic in another BSS. Thus, the channel is essentially time-shared between different BSSs, potentially leading to poor system performance.

A BSS may actually be quiet (i.e., in a state where no devices in the BSS transmit) although the sensed signal level is so low that successful transmission would have been possible. As a means to counteract the situation that the channel is sensed busy (and by that the transmission is deferred), although the signal power is so low that success transmission would have been possible, the threshold for where the channel is declared as busy may be increased. This is as such known in the art and sometimes referred to as dynamic sensitivity control (DSC).

Although DSC under certain circumstances may yield large improvement in terms of spectrum efficiency (as compared to when DSC is not used), DSC does not at all address the issue in WLAN that too much interference is generated due to the lack of power control.

On the other hand, in cellular systems, such as LTE, power control is used to minimize interference caused to other devices as well as to save power. Since the uplink (UL) and the downlink (DL) in cellular systems are using different resources, either in time (in case of time-division duplexing, TDD) or in frequency (in case of frequency-division duplexing, FDD), it may be ensured that different user equipment (UE) do not interfere with one another (in case of TDD there is a need to synchronize the radio base stations to avoid UL and DL to overlap and create interference between radio base stations and between UEs attached to different radio base stations). This means that when a UE is on the edge of network coverage for a radio base station the UE may still transmit at maximum power without other UEs being severely interfered.

However, for WLAN, because the same resources are used for both UL and DL, two STAs that are close to one another but operatively connected to different APs may severely impact each other. This impact may occur because of the above mentioned issue with CSMA/CA, but it may also occur because the carrier-to-interference ratio (C/I) becomes too small in case of strong interference.

One existing mechanism for handling issues with OBSS is based on fractional CSMA/CA and TPC for Interference Mitigation as presented in "Advanced power control techniques for interference mitigation in dense 802.11 networks" by Oteri, O. et al in the 16th International Symposium on Wireless Personal Multimedia Communications (herein after denoted Oteri). This mechanism may be used to coordinate transmissions between neighbouring BSSs to limit the interference experienced or caused by BSS-edge STAs to improve the overall throughput. This is achieved by limiting the transmission power in a neighbouring BSS when scheduling data to a BSS-edge STA. Effectively, STAs are divided into different groups. Associated with a group is a set of time slots when the channel may be accessed and a corresponding transmit power level. STAs that are close to the AP, denoted center STAs, are allowed to try to access the channel at all times, but are restricted to use a lower transmit power. STAs that are close to the edge of coverage, denoted edge STAs, are allowed to use higher output power, but are restricted to use the channel during certain time slots. By coordinating the use of the high power users such that the time slots when the STAs are allowed to transmit are not overlapping, or overlapping as little as possible, an improved energy efficiency is reported. Although the focus in Oteri is on energy efficiency, a gain in spectrum efficiency may be obtained due to the improved interference handling.

Another existing mechanism for handling STAs, as disclosed in "A Single-Channel Solution for Transmission Power Control in Wireless Ad Hoc Networks", by Muqattash, A., and Krunz, M., in the Proceedings of ACM MobiHoc, 2004 is called POWMAC, according to which the sending STAs adjust the transmission powers of data packets to allow for some interference margin at the receiving STAs. Information about this interference margin is included in the CTS packet and is used to limit the transmission power of potentially interfering STAs in the vicinity of a receiver, rather than muting such STAs. Multiple interference-limited transmissions in the vicinity of a receiver are allowed to overlap in time. This mechanism does not explicitly address issues with OBSS problem but instead targets the spatial reuse in a mobile Ad-Hoc networks.

However, there is still a need for improved handling of overlapping basic service sets in wireless communications systems.

SUMMARY

An object of embodiments herein is to provide efficient handling of overlapping basic service sets in wireless communications networks.

The inventors of the enclosed embodiments have realized that there are still some issues that are not fully addressed in Oteri.

One of these issues is that the proposed mechanisms may result in an increased number of hidden nodes, thus significantly increasing the number of collisions within a BSS, and thereby reducing the efficiency within a BSS. In general terms, in wireless communications networks, the hidden node problem or hidden terminal problem, occurs when a node, such as a station, is visible from an access point (AP), but not from one or more of the other nodes communicating with that AP. This may for example lead to difficulties in media access control. It could therefore be advantageous to enable efficient handling of OBBSs in wireless communications networks that achieves the benefits of fractional CSMA/CA but without increasing the probability for hidden nodes.

Another of these issues is that Oteri only is concerned with the needed power, and not whether it in practice causes interference to another BSS. It could therefore be advantageous to enable efficient handling of OBSSs in wireless communications networks that addresses this shortcoming.

According to a first aspect there is presented a method for allocating access to a communications channel in a wireless communications network. The method is performed by an access point (AP) in the wireless communications network. The AP is associated with stations (STAs).

The method comprises grouping the STAs of the AP in at least two groups of STAs, each group being associated with a minimum transmission power level needed by the AP to communicate with the STAs in that group. Equivalently, since the channel is assumed to be reciprocal, each group of STAs is associated with a minimum transmission power level needed by the STAs to communicate with the AP.

The method comprises allocating a first time interval for a first group of STAs associated with highest minimum transmission power to access the communications channel concurrently with a third time interval being allocated by another AP for a third group of STAs associated with lowest minimum transmission power level needed by said another AP to communicate with the third group of STAs to access the communications channel.

The method comprises allocating a second time interval, non-overlapping with the first time interval, for a second group of STAs associated with lowest minimum transmission power to access the communications channel concurrently with a fourth time interval being allocated by said another AP for a fourth group of STAs associated with highest minimum transmission power level needed by said another AP to communicate with the fourth group of STAs to access the communications channel.

Advantageously this enables efficient handling of overlapping basic service sets in wireless communications networks.

Advantageously this enables improved spectrum efficiency in case the same resources are used for both UL and DL.

Advantageously this enables improved spectrum efficiency with a minimum of coordination between the APs. The coordination may be totally transparent for the STAs, but merely require power control to be supported. In fact, the method is also applicable when the STAs do not support power control.

According to a second aspect there is presented an AP for allocating access to a communications channel in a wireless communications network. The AP comprises a processing unit.

The processing unit is configured to group STAs associated with the AP in at least two groups of STAs, each group being associated with a minimum transmission power level needed by the AP to communicate with the STAs in that group.

The processing unit is configured to allocate a first time interval for a first group of STAs associated with highest minimum transmission power to access the communications channel concurrently with a third time interval being allocated by another AP for a third group of STAs associated with lowest minimum transmission power level needed by said another AP to communicate with the third group of STAs to access the communications channel.

The processing unit is configured to allocate a second time interval, non-overlapping with the first time interval, for a second group of STAs associated with lowest minimum transmission power to access the communications channel concurrently with a fourth time interval being allocated by said another AP for a fourth group of STAs associated with highest minimum transmission power level needed by said another AP to communicate with the fourth group of STAs to access the communications channel.

According to a third aspect there is presented a computer program for allocating access to a communications channel in a wireless communications network, the computer program comprising computer program code which, when run on a processing unit, causes the processing unit to perform a method according to the first aspect.

According to a fourth aspect there is presented a computer program product comprising a computer program according to the third aspect and a computer readable means on which the computer program is stored.

It is to be noted that any feature of the first, second, third and fourth aspects may be applied to any other aspect, wherever appropriate. Likewise, any advantage of the first aspect may equally apply to the second, third, and/or fourth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1A:
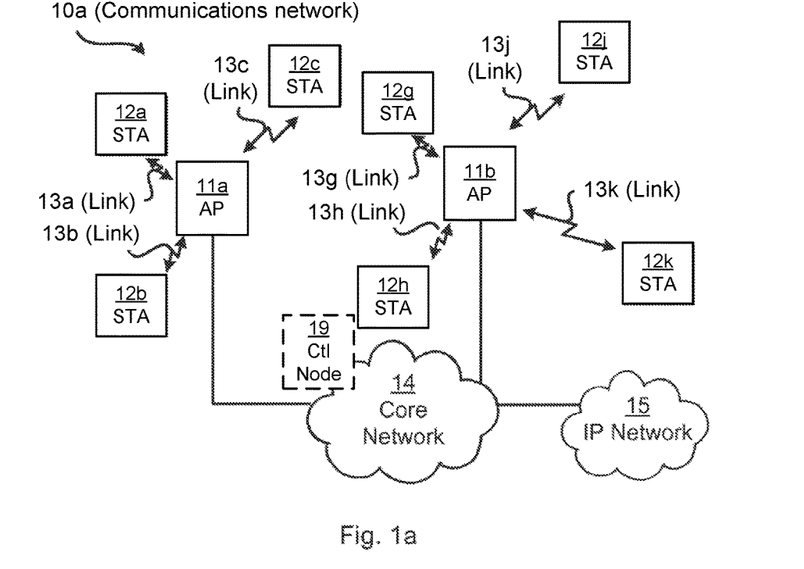
FIGS. 1a, 1b, and 1c are schematic diagram illustrating communication networks according to embodiments.

FIG. 1a is a schematic diagram illustrating a communications network boa where embodiments presented herein can be applied. The communications network boa comprises network nodes in the form of access points (APs) 11a, 11b. The APs 11a-b are configured to provide network coverage to wireless end-user stations (STAs) 12a-k. The STAs 12a-k may be any combination of hand-held wireless transceiver devices, such as mobile phones, smartphones, tablet computer, or laptop computers or the like, or other types of user equipment (UE). The APs 11a-b thus act as radio base stations for the STAs 12a-k. Each 12a-k is configured to be operatively connected to at least one AP 11a-b via a wireless link (not explicitly illustrated). The communications network boa further comprises a core network 14. The APs 11a-b are operatively connected to the core network 14. The core network 14 is in turn operatively connected to an Internet Protocol (IP) based service network 15. The 12a-k are thereby enabled to access content and services as provided by the IP based service network 15. Further, the communications network boa may comprise an optional controller node 19. The controller node 19 may be part of the core network 14. The controller node 19 may be operatively connected to the APs 11a-b and be configured to collect information from the APs 11a-b and provide information to the APs 11a-b. The controller node 19 may thereby be configured to instruct at least one AP 11a-b to allocate time intervals for STAs to access a communications channel in the communications network boa.

The communications network boa may be a wireless local area network (WLAN). In WLANs basic access to the communications channel is based on carrier sense multiple access with collision avoidance (CSMA/CA). When the access to the communications channel is handled in a completely distributed fashion, this is referred to as a distributed coordination function (DCF). This means that all STAs, as well as the AP, contend for the communications channel. There are also possibilities for a more centralized channel access scheme where the AP polls the different STAs, and in addition it is possible to combine the DCF with more centralized scheme in a hybrid manner, referred to as HCCF.

The embodiments disclosed herein relate to allocating access to a communications channel in a wireless communications network. In order to obtain such allocating there is provided an access point (AP), a method performed by the AP, a computer program comprising code, for example in the form of a computer program product, that when run on a processing unit, causes the processing unit to perform the method.

Figures 2A, 2B, 3:
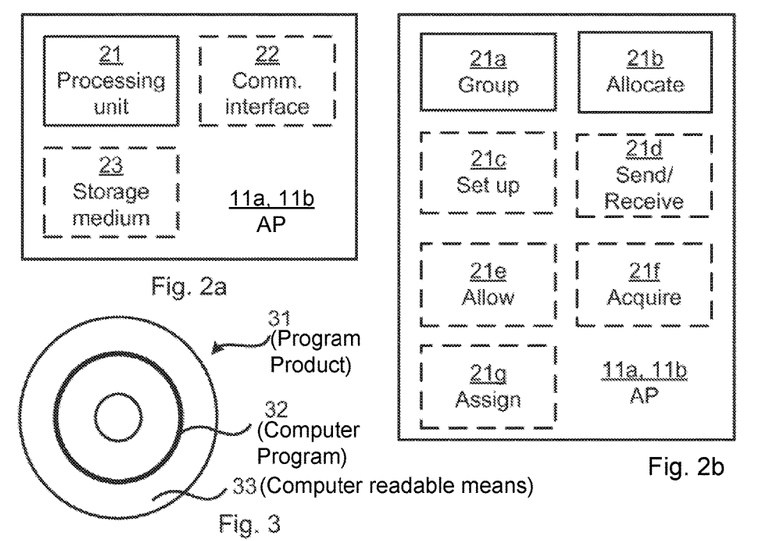
FIG. 2a is a schematic diagram showing functional units of an access point according to an embodiment.
FIG. 2b is a schematic diagram showing functional modules of an access point according to an embodiment.
FIG. 3 shows one example of a computer program product comprising computer readable means according to an embodiment.

FIG. 2a schematically illustrates, in terms of a number of functional units, the components of an access point (AP) 11a, 11b according to an embodiment. A processing unit 21 is provided using any combination of one or more of a suitable central processing unit (CPU), multiprocessor, microcontroller, digital signal processor (DSP), application specific integrated circuit (ASIC), field programmable gate arrays (FPGA) etc., capable of executing software instructions stored in a computer program product 31 (as in FIG. 3), e.g. in the form of a storage medium 23. Thus the processing unit 21 is thereby configured to execute methods as herein disclosed. The storage medium 23 may also comprise persistent storage, which, for example, can be any single one or combination of magnetic memory, optical memory, solid state memory or even remotely mounted memory. The AP 11a, 11b may further comprise a communications interface 22 for communications with another AP 11a, 11b, the core network 14, the controller node 19, and at least one station 12a-n. As such the communications interface 22 may comprise one or more transmitters and receivers, comprising analogue and digital components such as a digital-to-analogue converter and an analogue-to-digital converter, a suitable number of antennas for radio communications, and a suitable number of ports for wired communications. The processing unit 21 controls the general operation of the AP 11a, 11b e.g. by sending data and control signals to the communications interface 22 and the storage medium 23, by receiving data and reports from the communications interface 22, and by retrieving data and instructions from the storage medium 23.

Other components, as well as the related functionality, of the AP 11a, 11b are omitted in order not to obscure the concepts presented herein.

FIG. 2b schematically illustrates, in terms of a number of functional modules, the components of an access point (AP) 11a, 11b according to an embodiment. The AP 11a, 11b of FIG. 2b comprises a number of functional modules; a group module 21a, and an allocate module 21b. The AP 11a, 11b of FIG. 2b may further comprises a number of optional functional modules, such as any of a set up module 21c, a send/receive module 21d, an allow module 21e, an acquire module 21f, and an assign module 21g. The functionality of each functional module 21*a-h* will be further disclosed below in the context of which the functional modules 21*a-h* may be used. In general terms, each functional module 21*a-h* may be implemented in hardware or in software. The processing unit 21 may thus be configured to from the storage medium 23 fetch instructions as provided by a functional module 21*a-h* and to execute these instructions, thereby performing any steps as will be disclosed hereinafter.

Figure 4:
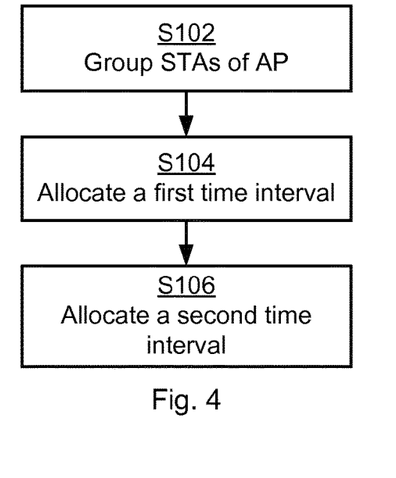
FIGS. 4 and 5 are flowcharts of methods according to embodiments.
Figure 5A:
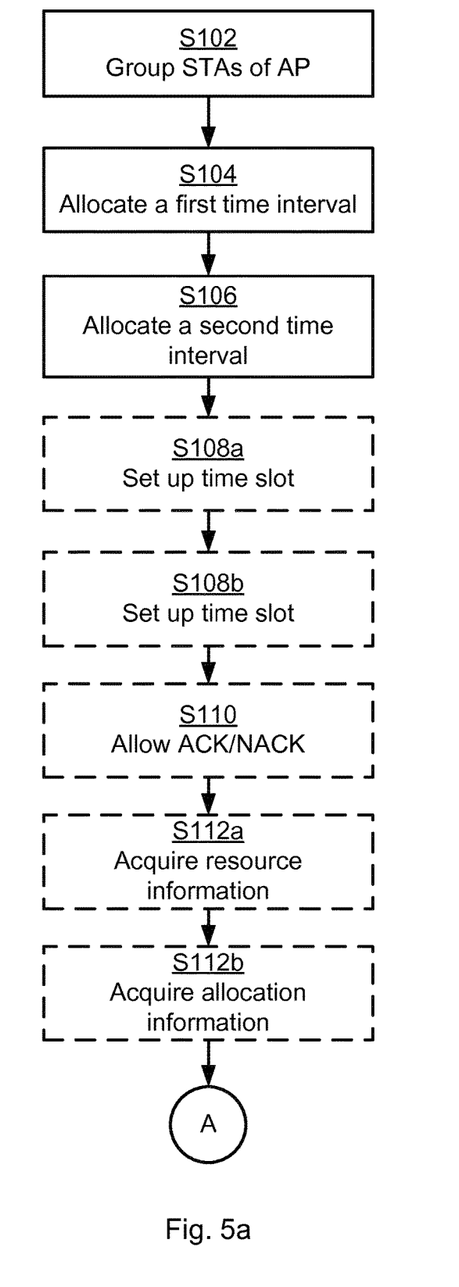
Figure 5B:
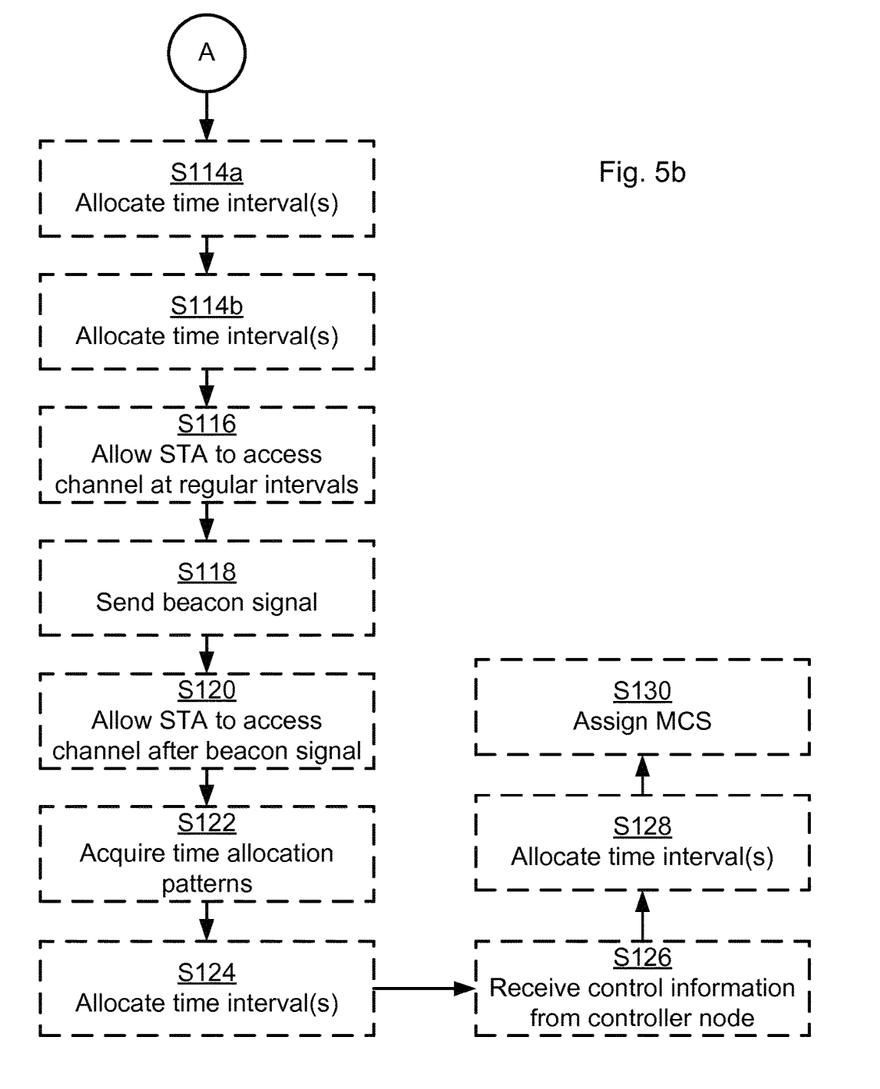

FIGS. 4 and 5 are flow chart illustrating embodiments of methods for allocating access to a communications channel in a wireless communications network. The methods are performed by the processing unit 21. The methods are advantageously provided as computer programs 32. FIG. 3 shows one example of a computer program product 31 comprising computer readable means 33. On this computer readable means 33, a computer program 32 can be stored, which computer program 32 can cause the processing unit 21 and thereto operatively coupled entities and devices, such as the communications interface 22 and the storage medium 23, to execute methods according to embodiments described herein. The computer program 32 and/or computer program product 31 may thus provide means for performing any steps as herein disclosed.

In the example of FIG. 3, the computer program product 31 is illustrated as an optical disc, such as a CD (compact disc) or a DVD (digital versatile disc) or a Blu-Ray disc. The computer program product 31 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory. Thus, while the computer program 32 is here schematically shown as a track on the depicted optical disk, the computer program 32 can be stored in any way which is suitable for the computer program product 31.

Reference is now made to FIG. 4 illustrating a method for allocating access to a communications channel in a wireless communications network boa-c according to an embodiment. The method is performed by an access point (AP) 11*a* in the wireless communications network. The AP 11*a* is configured such that the stations (STAs) 12*a*, . . . 12*f* are associated with the AP 11*a*.

The method comprises grouping, in a step S102, the STAs 12*a-f* of the AP 11*a* in at least two groups of STAs. Each group of STAs is associated with a minimum transmission power level needed by the AP to communicate with the STAs in that group. Alternatively, each group of STAs may be associated with a minimum transmission power level needed by the STAs in a group to communicate with the AP. The processing unit 21 of the AP 11*a* is configured to perform step S102, for example by implementing functionality of the group module 21*a*. Hence, the STAs 12*a-f* are grouped according to a power level criterion.

The method comprises allocating, in a step S104, a first time interval for a first group of STAs. The first group of STAs is associated with highest minimum transmission power of the at least two groups of the AP 11*a* to access the communications channel. The first time interval is concurrent with a third time interval allocated by another AP 11*b* for a third group of STAs. The third group of STAs is associated with lowest minimum transmission power level needed by said another AP to communicate with the third group of STAs to access the communications channel. The processing unit 21 of the AP 11*a* is configured to perform step S104, for example by implementing functionality of the allocate module 21*b*.

The method comprises allocating, in a step S106, a second time interval, non-overlapping with the first time interval, for a second group of STAs. The second group of STAs is associated with lowest minimum transmission power of the at least two groups of the AP 11*a* to access the communications channel. The second time interval is concurrent with a fourth time interval being allocated by said another AP for a fourth group of STAs. The fourth group of STAs is associated with highest minimum transmission power level needed by said another AP to communicate with the fourth group of STAs to access the communications channel. The processing unit 21 of the AP 11*a* is configured to perform step S106, for example by implementing functionality of the allocate module 21*b*.

To address the above disclosed short-comings of interference in case of OBSS, a method based on coordinated power control is thereby proposed. The method is based on two general principles. The first principle relates to conventional power control in the sense that a STA or AP should not transmit using higher transmit power than necessary. The second principle relates to coordinating the scheduling (i.e., the allocation of time intervals when STAs are allowed to access the communications channel) between different BSS such that the STAs that require high transmit power (either in DL, but even more in UL) are scheduled at different time instants. This allows for a reuse factor that effectively is close to one at the same time as it allows transmission to and from STAs with high transmit powers.

Embodiments relating to further details of allocating access to a communications channel in a wireless communications network will now be disclosed.

The herein disclosed methods are applicable for different types of access to the communications channel. For example, access to the communications channel may be based on carrier sense multiple access with collision avoidance (CSMA/CA). For example, Orthogonal Frequency-Division Multiple Access (OFDMA) may be used in the UL (i.e., the transmission from a STA 12*a-l* to an AP 11*a-b*).

The herein disclosed methods are applicable for different types of wireless networks. For example, the wireless communications network boa-c may be a wireless local area network (WLAN).

The herein disclosed methods are applicable for STAs operating in different modes. For example, the STAs 12*a-f* of the AP 11*a* may be STAs in idle mode or in connected mode and being within a coverage area 17*a* of the AP 11*a*.

The herein disclosed methods are applicable for both STAs with power control and STAs without power control. For example, STAs without power control may be grouped in the first group.

The allocating in any of steps S104 and S106 may further be based on additional information, properties, etc. For example, the allocating in any of steps S104 and S106 may based on at least one of location information, measured interference, and packet loss for the STAs of the AP. Further such additional information, properties, etc. will be disclosed below.

Reference is now made to FIG. 5 illustrating methods for allocating access to a communications channel in a wireless communications network according to further embodiments.

There may be different ways to allocate access to the communications channel as in steps S104 and S106. Different embodiments relating thereto will now be described in turn.

For example, allocating the first time interval in step S104 and the second time interval in step S106 may involve setting up time slots to at least some of the STAs of the AP 11a. The method may therefore comprise an optional step S108a of setting up time slots for when STAs in the first group are allowed to transmit; and/or an optional step S108b of setting up time slots for when STAs in the second group are allowed to transmit. The processing unit 21 of the AP 11a may be configured to perform any of steps S108a and S108b, for example by implementing functionality of the set up module 21C.

For example, allocating the first time interval in step S104 and the second time interval in step S106 may involve allowing at least some of the STAs of the AP 11a to respond to previous transmissions from the AP 11a. The method may therefore comprise an optional step S110 of allowing STAs in at least one of the first group and the second group to transmit at least one of an acknowledgement (ACK) report and a negative acknowledgement (NACK) report to the AP 11a. The processing unit 21 of the AP 11a may be configured to perform step S110, for example by implementing functionality of the allow module 21e.

As noted above, the allocating in any of steps S104 and S106 may further be based on additional information, properties, etc. Further examples relating thereto will now be disclosed.

As will be further disclosed below, different STAs may have different needs in terms of resources. The allocating may therefore be based on resource information. The method may therefore comprise an optional step S112a of acquiring resource information regarding a transmit resources need for the STAs of the AP; and an optional step S114a of allocating at least one of the first time interval and the second time interval based on the acquired resource information. The processing unit 21 of the AP 11a may be configured to perform any of steps S112a and S114a, for example by implementing functionality of the acquire module 21f and the allocate module 21b.

For example, the allocating may be based on allocation information. The method may therefore comprise an optional step S112b of acquiring allocation information regarding allocation of STAs of said another AP 11b from said another AP 11b; and an optional step S114b of allocating at least one of the first time interval and the second time interval based on the acquired allocation information. The processing unit 21 of the AP 11a may be configured to perform step any of steps S112b and S114b, for example by implementing functionality of the acquire module 21f and the allocate module 21b.

There may be different ways for when the STAs are allowed to access the communications channel as in the first time interval in step S104 and as in the second time interval in step S106.

For example, the first time interval and/or the second time interval may be based on regular time intervals. The method may therefore comprise an optional step S116 of allowing STAs in at least one of the first group and the second group to access the communications channel at regular time intervals. The processing unit 21 of the AP 11a may be configured to perform step S116, for example by implementing functionality of the allow module 21e.

For example, the first time interval and/or the second time interval may be based on when in time a beacon signal is transmitted by one of the AP 11a and said another AP 11b The method may therefore comprise an optional step S118 of sending a beacon signal; and an optional step S120 of allowing STAs in at least one of the first group and the second group to access the communications channel after a predetermined time interval from when the beacon signal was sent. The processing unit 21 of the AP 11a may be configured to perform any of steps S122 and S124, for example by implementing functionality of the send/receive module 21d and the allow module 21e.

For example, the first time interval and/or the second time interval may be based on a time allocation pattern. The method may therefore comprise an optional step S122 of acquiring a time allocation pattern; and an optional step S124 of allocating at least one of the first time interval and the second time interval based on the acquired time allocation pattern. The processing unit 21 of the AP 11a may be configured to perform any of steps S122 and S124, for example by implementing functionality of the acquire module 21f and the allocate module 21b. The acquired time allocation pattern may be a courtesy contention window pattern (CCWP).

For example, the first time interval and/or the second time interval may be based on control information from a controller node 19. The method may therefore comprise an optional step S126 of receiving control information from a controller node 19; and an optional step S132 of allocating at least one of the first time interval and the second time interval based on the acquired control information. The processing unit 21 of the AP 11a may be configured to perform any of steps S126 and S128, for example by implementing functionality of the send/receive module 21d and the allocate module 21b.

STAs may be moved from one group to another group. For example, the method may comprise an optional step S130 of assigning a modulation and coding scheme (MCS) to at least one STA in the first group, thereby moving the at least one STA to the second group. For example, by assigning another MCS to at least one STA in the second group, the at least one STA may be moved to the first group. The processing unit 21 of the AP 11a may be configured to perform step S130, for example by implementing functionality of the assign module 21g.

Some particular embodiments based on the above disclosed general embodiments will now be described in detail. However, although each particular embodiment is described in isolation, features from at least two different particular embodiments may be combined.

To ease the description of the particular embodiments, but without limiting the general scope of the herein disclosed general embodiments, the particular embodiments are described by means of specific examples.

Figure 1B:
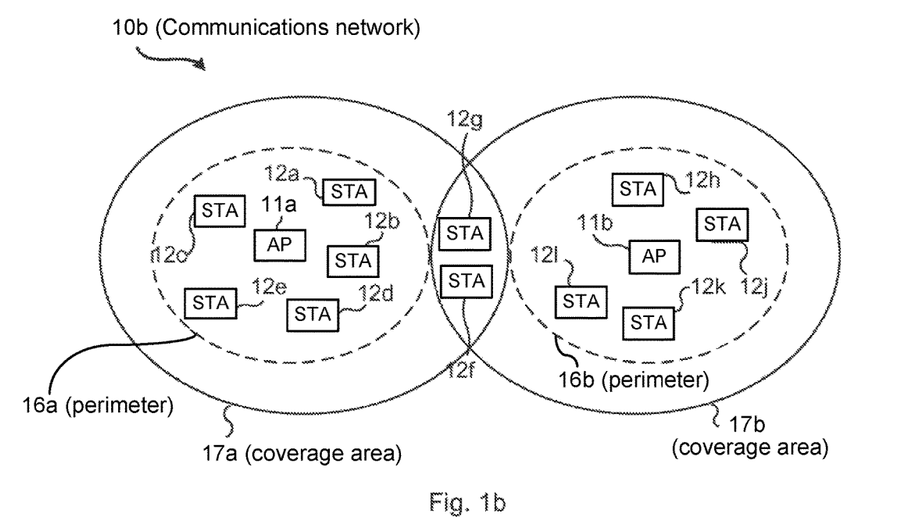

Consider FIG. 1b, illustrating a situation with two APs 11a-b and a number of STAs 12a-l associated with a respective AP 11a-b. STAs 12a-f are associated with AP 11a, whereas STAs 12g-l are associated with AP 11b. AP 11a and STAs 12a-f thus form a BSS and AP 11b and STAs 12g-l thus form another BSS. The dashed lines 16a, 16b illustrate the network coverage areas of an AP 11a-b in case a lower transmit power level is used (corresponding to a lowest minimum transmission power being needed by STAs to access the communications channel) and the solid lines 17a, 17b illustrate the network coverage areas in case a higher transmit power level is used (corresponding to a highest minimum transmission power being needed by STAs to access the communications channel). In the illustrative non-limiting example of FIG. 1b this means that AP 11a only needs to use the higher transmit power when transmitting to STA 12f and vice versa since propagation loss is reciprocal, but can use the lower transmit power when transmitting to STA 12a, STA 12b, STA 12c, STA 12d, and STA 12e.

Similarly, AP 11*b* only needs to use the highest transmit power when transmitting to STA 12*g*, but can use the lower transmit power when transmitting to STA 12*h-l*. Hence, according to the illustrative example of FIG. 1*b* the first time interval is in step S104 allocated for a first group of STAs consisting of STA 12*f* for AP 11*a*; and the second time interval is in step S106 allocated for a second group of STAs consisting of STA 12*a-e* for AP 11*a*. Similarly, the third group of STAs associated with AP 11*b* consists of STAs 12*h-l*; and the fourth group of STAs associated with AP 11*b* consists of STA 12*g*.

Moreover, it is for illustrative purposes assumed that the same channel is used by both AP 11*a* and AP 11*b* so as to illustrate the above mentioned issues with OBSS.

According to state of the art, with all STAs 12*a-l* and both APs 11*a-b* transmitting at maximum transmission power it may be so that all devices (APs as well as STAs) can hear all other devices, implying that only one of the devices will transmit at the same time since all other devices will defer from transmission. Consequently, the two BSSs (associated with AP 11*a* and AP 11*b*, respectively) will effectively share the communications channel in time such that the throughput of each BSS is reduced to 50%.

In case DSC control is used, the STAs that are close to respective AP 11*a-b*, such as within the range defined by the perimeters 16*a* and 16*b*, respectively, may be able to communicate as they may be able to ensure that the C/I is sufficiently large. This, however, still means that there are issues for the STAs that are far from respective AP 11*a-b* (in the illustrative example of FIG. 1*b* these are STA 12*f* and STA 12*g*). Since DSC exploits that the C/I will be sufficiently larger although the interference, I, is large, DSC will not help for the STAs far from the APs.

According to a first particular embodiment, the above short-coming of DSC in the state of the art is circumvented by using coordinated power control as follows based at least on performing steps S102, S104, and S106 as disclosed above. AP 11*a* and AP 11*b* may exchange information concerning how much of the total time is needed for the STAs 12*f*, 12*g* that need to transmit at the higher transmission power and in addition agree on non-overlapping timeslots when STAs 12*f*, 12*g* in respective BSSs may use the higher transmission power.

As noted above, different STAs may have different needs in terms of resources. The relative size of the allocated time intervals for STAs in the different groups may therefore be based on the resource needs for the STAs associated with a time interval. For example, if the resource needs for low power STAs is much larger than that for high power STAs, the relative time allocated to low power STAs may be large compared to that allocated to the high power STAs. For the example, for illustrative and non-limiting purposes it is assumed that STA 12*f* (belonging to AP 11*a*) needs 20% of the time, whereas STA 12*g* (of AP 11*b*) needs 25% of the time. In general time, the needed time may depend on the required throughput as well as what modulation and coding scheme (MCS) can be used. AP 11*a* and AP 11*b* may then determine a schedule with a period of e.g., 20 ms where AP 11*a* can schedule STA 12*f* during the first 4 ms of every such period, and where AP 11*b* can schedule STA 12*g* from 4 ms to 9 ms of every such period.

Scheduling here implies setting up different time slots in which different devices of the wireless communications network are allowed to initiate a transmission by accessing the communications channel of the wireless communications network. The time slots may be set up by first performing 3*o* the allocating as in steps S104 and S106. In the example of an AP 11*a-b* transmitting to a STA 12*a-l*, the AP 11*a-b* handling the schedule of transmit slots knows when to transmit to certain STAs 12*a-l*. For STAs 12*a-l* transmitting to the AP 11*a-b* they will be made aware of when they are allowed to perform such transmissions according to the schedule (or allocation) set up by the serving AP 11*a-b* (i.e., AP 11*a* for STAs 12*a-f* and AP 11*b* for STAs 12*g-l*). This information may be shared with the STAs 12*a-l* in different ways. Examples include, but are not limited to, direct scheduling commands from the AP 11*a-b*, signalling of the schedule by the AP 11*a-b*, signalling of the schedule relative to some other events, such as beacon frames, or other ways to determine the schedule based on parameters known by the STA 12*a-l*, for example in cases of pseudo random schedules.

According to the present illustrative non-limiting example, during the first 4 ms of each period, AP 11*a* may thus schedule STA 12*f*. AP 11*a* may also schedule any of the other STAs 12*a-e* if found beneficial for some reason. At the same time, AP 11*b* may schedule any of STAs 12*h-l*, but may not schedule STA 12*g* since this would cause too low C/I for STA 12*f* and this period is aimed for protecting the transmission to STA 12*f*. In a similar fashion, during the remaining of the period (i.e., during time 4-9 ms), AP 11*b* may schedule STA 12*g*. AP 11*a* may during this time schedule any STA except STA 12*f*, since STA 12*f* is transmitting at the higher transmission power and may thus disturb STA 12*g* currently being scheduled.

Considering the first 4 ms and assuming that STA 12*f* is scheduled, transmissions between AP 11*a* and STA 12*f* will be successful because the transmission to and from AP 11*b* will be of sufficiently low power to ensure that the interference to AP 11*a* as well as to STA 12*f* will be low enough to give a sufficient C/I. At the same time, thanks to that STAs 12*h-l* operatively connected to AP 11*b* are close to AP 11*b* they may withstand a relatively high interference from STA 12*f* and still having sufficient C/I. Thus, both BSSs will be able to operate simultaneously (or concurrently).

According to this first particular embodiment, the two APs 11*a-b* exchange information about, and agreed on when, higher output powers may be used. This first particular embodiment is also applicable to situations with more than two APs 11*a*, 11*b*, 11*c*, such as in the illustrative non-limiting example of FIG. 1*c*. The APs 11*a-c* may communicate via a wired backhaul or by using wireless links.

According to this first particular embodiment the time intervals allocated to STAs using the lower transmission power is not over lapping with the time intervals allocated for the STAs using the higher transmission power for the same AP. This is in contrast to the proposal in Oteri. One issue with the proposal in Oteri is that it will potentially cause a detrimental hidden node problem. As an example, suppose that all STAs 12*a-f* associated with AP 11*a* would be allowed to transmit during the same time interval. Since, for instance, STA 12*c* and STA 12*e* are far away from STA 12*f*, STA 12*c* and STA 12*e* may be hidden for STA 12*f*. Thus, if STA 12*c* or STA 12*e* starts to transmit, there may be a high likelihood that STA 12*f* also starts transmitting, resulting in a collision at the AP 11*a*. According to this first particular embodiment this situation is avoided by ensuring that the STAs using different transmission powers are allocate to non-overlapping (orthogonal) time slots.

The first particular embodiment may be implemented using restrictive access windows (RAWs), as described in IEEE 802.11ah, D1.2.

According to a second particular embodiment, no explicit cooperation between the APs 11a-c is needed. According to the second particular embodiment, where still power control is used, a first AP 11a is configured to schedule high power transmission (by performing step S104) at regular intervals, e.g. during 10 ms directly following a beacon transmission. Other APs 11b-c may in this way predict when the high power transmissions associated with the BSS of AP 11a may occur and may select non-overlapping time intervals for using the higher output power, e.g. the 10 ms directly following the time interval selected by the first AP 11a.

Figure 1C:
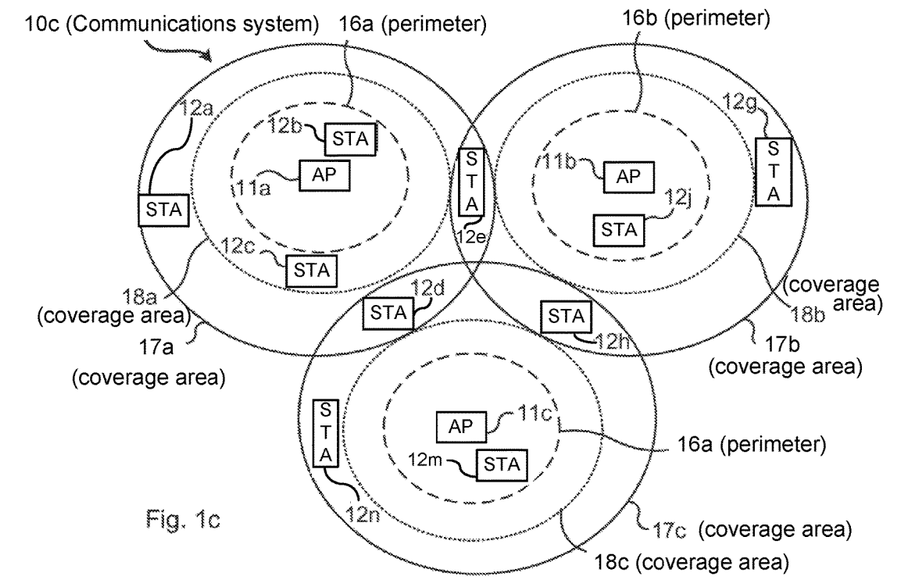

Now referring to FIG. 1c, according to a third particular embodiment, the different APs 11a-c are configured to use specific pattern for when they are allowed to use certain output powers. For instance, in case of only two power levels, an AP 11a-c may use the higher output power only during certain time instants. Such a pattern may be a courtesy contention window pattern, CCWP. These patterns may be selected such that the patterns for each AP 11a-c overlap as little as possible. As a specific example, it is for illustrative and non-limiting purposes assumed that an AP 11a-c is allowed to use the higher output power during two 5 ms slots between every two beacon transmissions (100 ms). This means that there in total are 20 possible slots, and in each interval, i.e., between two beacons, the AP 11a-c uses two slots that may be selected in a pseudo random fashion (according, for example according to the CCWP). If several APs 11a-c potentially interfere with one another, the APs 11a-c may use different CCWPs. Again, in contrast to Oteri, according to a third particular embodiment the CCWPs pattern may be determined such that when the pattern indicate that a high transmission power may be used by a STAs associated with a specific AP, then the STAs only allowed to use the lower output power are not allowed to contend for the communications channel in order to avoid the hidden node problem.

If the number of APs 11a-c is small compared to the number of available time slots, the CCWPs can be made perfectly orthogonal such that the time intervals do not overlap. For the example above with 20 slots and two slots for each AP 11a-c, this means that 10 APs 11a-c may be supported with perfectly orthogonal CCWPs. When the number of needed slots is larger, the CCWPs may not be perfectly orthogonal, but instead the CCWPs may be determined such that they overlap as little as possible. How to find many sequences of a certain length with good cross-correlation properties is a well-studied field in the art, and the CCWP may for example be based on so-called Gold Sequences (or Gold Codes), which are sometime used in spread spectrum systems.

In a controlled deployment, the different APs 11a-c may be provided with a suitable CCWP from a controller node 19. In a non-controlled deployment, the APs 11a-c may themselves determine suitable CCWP patterns. In the latter case, the CCWPs may be selected at random, or an AP 11a-c may try to determine what CCWP patterns are already used by overlapping BSSs, and based on this select a suitable CCWP. Another possibility in the non-controlled deployment is for each AP 11a-b to distribute its CCWP to all other APs 11a-c. Based on these initial CCWPs, each particular AP 11a-c may be configured to optimize a new CCWP based on transmission and/or reception requirements for STAs associated with the particular AP or based on such requirements for the particular AP itself. This new CCWP may again be distributed to all other APs 11a-c. This procedure may be iterated a predetermined number of times, or until some value representing the optimization of CCWP has converged to a limit.

Within the third particular embodiment it is also possible to include more than two levels of output power in the CCWPs. One way to enable this is to have several different pseudo random sequences, one for each power level.

According to the above disclosed particular embodiments, the coordination has been performed amongst the APs 11a-c, and optionally by a controller node 19. All the above disclosed particular embodiments may be regarded as being concerned with the actual scheduling. There may be different ways for the APs 11a-c, or optionally the controller node 19, to obtain information needed for this scheduling; all of the above disclosed particular embodiments are applicable regardless of how this information is obtained. As one example, the information may be collected by the APs 11a-c without any input from the involved STAs 12a-l. As another example, information from one or several STAs 12a-l may be used in addition or alternatively to the information directly available at the AP 11a-c.

In case power control is not supported by some to the STAs 12a-l, these STAs 12a-l may preferably be put in the group using the highest output power. If the number of STAs 12a-l not supporting power control is large, this may imply that these groups will become larger and make the scheduling more difficult. For example, either it may need to be accepted that there will be transmissions where more than one AP 11a-c schedule high power STAs, or it may need to be accepted that the high power STAs will be given less time for transmission. This approach is applicable for all of the above disclosed particular embodiments.

According to the above particular embodiments the scheduling is only based on what output power is needed. When the number of BSSs that are potentially interfering with one another becomes larger, this may, however, be unnecessary restrictive. To illustrate this, consider the illustrative non-limiting example of FIG. 1c. FIG. 1c schematically illustrates a communications system 10c. In FIG. 1c STA 12a-e are associated with AP 11a, STA g-j are associated with AP 11b, and STA m-n are associated with AP 11c. STA 12b, STA 12j, and STA 12m are sufficiently close to their respective AP 11a-c to use a lower transmission power, whereas the other STAs need to use a higher output power. In FIG. 1c is also schematically illustrated a further, intermediate power level, as represented by the network coverage areas 18a, 18b, 18c. Thus, STA 12c may be enable to access the communications channel using a transmission power being lower than the highest minimum transmission power level and higher than the lowest minimum transmission power level. Hence, STA 12c may be grouped in a further group being associated with an intermediate minimum transmission power level needed by the AP 11a to communicate with the STA 12c in that group. This further group of STAs may be allocated a further time interval for accessing the communications channel. This further time interval may be non-overlapping with at least one of the first time interval and the second time interval.

Since all these three BSSs may potentially interfere with one another, a coordinated scheduling between the three APs 11a-c only based on transmission power would divide the available time between the three BSSs (each represented by its respective AP 11a, 11b, 1nd 11c) in some suitable way. However, referring to FIG. 1c and the high power STAs 12a, 12e, and 12d associated with AP 11a it is readily understood that STA 12a will not cause interference to the other BSSs as represented by AP 11b and 11c if assuming the same, homogeneous, propagation properties (irrespective of location and direction) which may not be true in a real deployment. Further, STA 12d will only cause interference to the BSS represented by AP 11c; and STA 12e will only cause interference to the BSS represented by AP 11b. Consequently, it would be possible to allow at least some of the high power STAs 12a, 12d, 12e, 12g, 12h, 12n to in some cases transmit concurrently (or simultaneously).

Again referring to FIG. 1c, and assuming that the only high power STAs would have been STA 12a, STA 12g, and STA 12n, i.e. disregarding STA 12d, STA 12e, and STA 12h. No coordination at all would then have been needed between the three APs 11a-c, and the high power STAs 12a, 12g, and 12n could transmit concurrently (or simultaneously). On the other hand, with the only high power STAs being STA 12d, STA 12e and STA 12f, coordinated scheduling could make a difference. In particular, since STA 12d may transmit to AP 11a at the same time as STA 12h may transmit to AP 11b, whereas STA 12e cannot transmit to AP 11a, this information may, for example, be used to give 50% of the high power time to the BSS represented by AP 11a and 50% of the high transmission power time to the BSS represented by AP 11b, and in addition allowing STA 12b to transmit during the high power time interval of the BSS represented by AP 11b. In this way the BSS represented by AP 11a could be active 100% of the time and the BSS represented by AP 11b could be active 50% of the time. This means that in total, the high power STAs effectively would be allowed more than 100% airtime. Without this information, whatever the actual scheduling, the 100% needs to be shared among the high power STAs.

Therefore, according to a fourth particular embodiment, not only the required power is considered when scheduling the STAs 12a-n, but also information about how STAs 12a-may potentially interfere with each other. As the skilled person understands there are several options for how this information may be obtained. Examples of how this information may be obtained include, but are not limited to, direct measurements of the interference levels that different STAs 12a-n cause to one another, and by obtaining information of the locations of the STAs 12a-n (in which case the path loss may be estimated and through this the interference may be estimated). Information may also be obtained indirectly by monitoring packet loss through collisions and in that way correlate when certain STAs 12a-n transmit and when collisions take place at specific STAs 12a-n.

According to the particular embodiments disclosed above, the STAs 12a-n have been divided in two groups; high power STAs and low power STAs, and then scheduling among the APs 11a-c for when the high power STAs are allowed transmit (and when corresponding APs can transmit with high power) has been performed. The time interval when a specific AP 11a-c is not allowed to use the highest transmission power was then allocated to the STAs using the lower output power. In Oteri this is done differently in that the low power STAs are allowed to access the channel at all times. Now, focusing on the partitioning between high power STAs and low power STAs, it can be expected that in many cases the required transmission capacity for the low power STAs and the high power STAs will not match very well with the time interval that are allocated to these two categories, respectively. For instance, it may be so that the high power STAs are allocated too little time in relation to the required capacity for those STAs (a situation which is more likely if not the actual interference situation is considered as described in some of the particular embodiments above).

Therefore, according to a fifth particular embodiment the APs 11a-c also takes this information into account when grouping the STAs into high power STAs and low power STAs. Specifically, in case the required capacity for the high power STAs cannot be met, the APs 11a-c may be configured to change one or more of the high power STAs into low power STAs by mandating a lower MCS so that the wireless link between such STAs and the AP can be maintained but with a lower Signal-to-interference-ratio (SIR). Changing the allocated timing of high power STAs versus low power STAs may also be an option, but may require coordination between the BSSs. According to the fifth particular embodiment, there is not a direct relation between the needed transmission power and the path loss, but rather there is direct relation between the needed transmission power and the required received power, which in turn will depend on the selected MCS.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

For example, some embodiments have been described for being used for IEEE 802.11, and therefore the notation Access Point (AP) and Station (STA) has bee used to denote the network node (base station) and the mobile stations (user equipment; UE), respectively. However, as is obvious for the person skilled in the art, the herein disclosed embodiments are not limited to this standard, but may be applied also to other standards, mutatis mutandis.

For example, some embodiments have been described in scenarios where the physical layer (PHY) is based on orthogonal frequency division multiplexing (OFDM). The principles of the herein disclosed embodiments are applicable also to other PHYs, for instance a PHY based on direct sequence spread spectrum (DSSS).

Signalling needed for ensuring that the STAs do transmit at suitable time is transmitted from the AP to the STAs. The signalling may be provided in each packet, e.g. the MAC header of the packet, but it may also be transmitted less frequent, e.g. by the AP sending dedicated control packets, either to STAs individually or using e.g. multi-cast.

The invention claimed is:

1. A method for allocating access to a communications channel in a wireless communications network, the method being performed by an access point, AP, in the wireless communications network and associated with stations, STAs, and comprising the steps of:

grouping the STAs of the AP into at least two groups of STAs, each group being associated with an own minimum transmission power level needed by the AP to communicate with the STAs in the associated group of said at least two groups;

allocating a first time interval for a first group of STAs associated with highest minimum transmission power to access the communications channel concurrently with a third time interval being allocated by another AP for a third group of STAs associated with lowest minimum transmission power level needed by said another AP to communicate with said third group of STAs to access the communications channel; and allocating a second time interval, non-overlapping with said first time interval, for a second group of STAs associated with lowest minimum transmission power to access the communications channel concurrently with a fourth time interval being allocated by said another AP for a fourth group of STAs associated with highest minimum transmission power level needed by said another AP to communicate with said fourth group of STAs to access the communications channel.

2. The method according to claim 1, further comprising at least one of:
setting up time slots for when STAs in said first group are allowed to transmit; and
setting up time slots for when STAs in said second group are allowed to transmit.

3. The method according to claim 1, further comprising:
allowing STAs in at least one of said first group and said second group to transmit at least one of an acknowledgement, ACK, report and a negative acknowledgement, NACK, report to the AP.

4. The method according to claim 1, further comprising:
acquiring resource information regarding transmit resources needed by the STAs of the AP; and:
allocating at least one of said first time interval and said second time interval based on said acquired resource information.

5. The method according to claim 1, further comprising:
acquiring allocation information regarding allocation of STAs of said another AP from said another AP; and:
allocating at least one of said first time interval and said second time interval based on said acquired allocation information.

6. The method according to claim 1, further comprises:
allowing STAs in at least one of said first group and said second group to access said communications channel at regular time intervals.

7. The method according to claim 1, further comprising:
sending a beacon signal; and
allowing STAs in at least one of said first group and said second group to access said communications channel after a predetermined time interval from when said beacon signal was sent.

8. The method according to claim 1, further comprising:
acquiring a time allocation pattern; and
allocating at least one of said first time interval and said second time interval based on said acquired time allocation pattern.

9. The method according to claim 8, wherein said time allocation pattern is a courtesy contention window pattern, CCWP.

10. The method according to claim 1, further comprising:
receiving control information from a controller node; and
allocating at least one of said first time interval and said second time interval based on said acquired control information.

11. The method according to claim 1, wherein STAs without power control are grouped in said first group.

12. The method according to claim 1, wherein said allocating further is based on at least one of location information, measured interference, and packet loss for the STAs of the AP.

13. The method according to claim 1, further comprising:
assigning a modulation and coding scheme, MCS, to at least one STA in said first group, thereby moving said at least one STA to said second group.

14. The method according to claim 1, wherein the access to said communications channel is based on carrier sense multiple access with collision avoidance, CSMA/CA.

15. The method according to claim 1, wherein the wireless communications network is a wireless local area network, WLAN.

16. The method according to claim 1, wherein the STAs of the AP are STAs in idle mode or in connected mode and being within a coverage area of the AP.

17. An access point, AP, for allocating access to a communications channel in a wireless communications network, the AP comprising a processing unit configured to:
group stations, STAs, associated with the AP into at least two groups of STAs, each group being associated with an own minimum transmission power level needed by the AP to communicate with the STAs in the associated group of said at least two groups;
allocate a first time interval for a first group of STAs associated with highest minimum transmission power to access the communications channel concurrently with a third time interval being allocated by another AP for a third group of STAs associated with lowest minimum transmission power level needed by said another AP to communicate with said third group of STAs to access the communications channel; and
allocate a second time interval, non-overlapping with said first time interval, for a second group of STAs associated with lowest minimum transmission power to access the communications channel concurrently with a fourth time interval being allocated by said another AP for a fourth group of STAs associated with highest minimum transmission power level needed by said another AP to communicate with said fourth group of STAs to access the communications channel.

18. A nontransitory computer readable storage medium comprising a computer program for allocating access to a communications channel in a wireless communications network, the computer program comprising computer code which, when run on a processing unit, causes the processing unit to:
group stations, STAs, associated with an access point, AP, into at least two groups of STAs, each group being associated with an own minimum transmission power level needed by the AP to communicate with the STAs in the associated group of said at least two groups;
allocate a first time interval for a first group of STAs associated with highest minimum transmission power to access the communications channel concurrently with a third time interval being allocated by another AP for a third group of STAs associated with lowest minimum transmission power level needed by said another AP to communicate with said third group of STAs to access the communications channel; and
allocate a second time interval, non-overlapping with said first time interval, for a second group of STAs associated with lowest minimum transmission power to access the communications channel concurrently with a fourth time interval being allocated by said another AP for a fourth group of STAs associated with highest minimum transmission power level needed by said another AP to communicate with said fourth group of STAs to access the communications channel.

* * * * *